United States Patent Office 3,630,996
Patented Dec. 28, 1971

3,630,996
SINGLE PACKAGE LATENT CURE POLYEPOXIDE SYSTEMS EMPLOYING 2,2'-BI-2-OXAZOLINE OR OXAZINE COPOLYMERIC CURING AGENTS
Donald A. Tomalia, Midland, Mich., assignor to The Dow Chemical Company, Midland, Mich.
No Drawing. Continuation-in-part of application Ser. No. 833,764, June 16, 1969. This application May 8, 1970, Ser. No. 35,885
Int. Cl. C08g 30/14
U.S. Cl. 260—47 EN          5 Claims

ABSTRACT OF THE DISCLOSURE

Doubly oxazoline or oxazine terminated alkylene, loweralkylene glycol, polyloweralkylene glycol or their sulfur analogues, combined with curable poly 1,2-epoxyalkyl compounds yield stable, homogeneous single-package compositions of viscosity below that of the starting materials, which can be held for long periods of time uncured, but cure promptly upon heating. The resulting cured epoxy resins are of superior properties including very high resistance to thermal shock, and manifest elastomeric properties, excellent solvent resistance, and desirably high heat distortion temperatures.

RELATIONSHIP TO OTHER APPLICATION

This is a continuation-in-part of my application Ser. No. 833,764, filed June 16, 1969, now abandoned.

BACKGROUND OF THE INVENTION

Field of the invention

The curable polyepoxides which are cured to yield epoxy resins are well known, and various of them have become major articles of commerce. All possess in common the fact that the molecules have an average of more than one 1,2-epoxyaliphatic groups, average. All have in common their susceptibility to cure, that is to say, reaction whereby the epoxyaliphatic (typically oxirane) ring is opened, and cross-linking between molecules occurs, giving rise to firm, solvent-resistant, usually heat-resistant resins of good electrical and mechanical properties, commonly known as epoxy resins. The properties of the resulting resin depend to a substantial extent upon the nature of the curing system by which it is cured. However, all the polyepoxides of the sort above described possess, in common, the attribute of curability.

In general, any curing system, when and as completely assembled with curable polyepoxide, has usually already initiated curing reaction, even if only at a low level, with the result that the shelf- or pot-life of the resulting curable product has been relatively brief.

THE PRIOR ART

Feinauer et al., 698 Analen 174 (1966) have shown the reaction between certain monooxazolines and monoepoxides to produce various 1 - aza - 4,6 - dioxa-bicyclo-[3.3.0] octane compounds.

Numerous systems for the curing of polyepoxides are known in the art; by reference, there are incorporated here chapters 5 through 13 of "Handbook of Epoxy Resins" (McGraw Hill, New York, 1967) by Lee and Neville, wherein general and particular discussion of the curing of epoxy resins is presented.

DESCRIPTION OF THE PRESENT INVENTION

According to the present invention, there are provided dioxazoline or dioxazine compounds represented by compounds of the formula

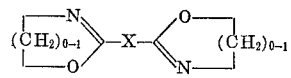

where X is one of the divalent moieties

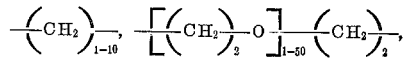

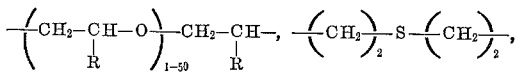

or

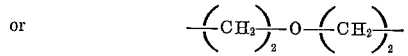

wherein R is alkyl of from one to three, both inclusive, carbon atoms, intimately mixed with and dispersed substantially uniformly throughout a curable polyepoxide. Such mixture remains substantially chemically unmodified over an extended shelf life, until it is heated to a curing temperature, whereupon cure takes place promptly and results in the formation of a highly cross-linked, shock-resistant, relatively elastic epoxy resin having desirably high heat distortion temperature and excellent solvent resistance, together with corrosion and ultra-violet resistance hitherto unknown.

The polyepoxide can be any poly 1,2-epoxyalkyl compound having an average of more than one such epoxyalkyl moiety per molecule and of the type well-known to be cured to obtain an epoxy resin. The reactivity of such compounds, generally, and their reactivity in the present invention, depends upon the presence of the epoxyalkyl group; their ability to form a highly cross-linked epoxy resin depends upon the presence of an average of more than one such group per molecule and as to the operability of the instant invention, all are equivalent.

Polyoxazoline and polyoxazine compounds of more than two oxazine or oxazoline rings are entirely useful and result in cured resins of good properties.

A bis-oxazoline of this invention, when mixed into and heated with a curable polyepoxide, reacts in two ways. In one way, through reaction at the site of the double bond in the oxazoline, a double ring adduct is formed, of the general formula

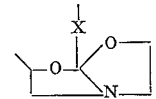

wherein X has the value hereinbefore set forth. This ring structure in some way catalyzes the self-cure of the polyepoxide in manner to give the known polyether structure of the cured epoxy resin, while, itself, the double ring heterocycle system also reacts with and becomes chemically bound into the cured resin.

Oxazoline or oxazine compound can be supplied in amount from one equivalent percent of polyepoxide epoxy functionality to 100 mole percent which is to say, fully equivalent amount; within this range, simple range-finding tests will establish the optimum catalytic, coreactant amount for a given intended application. In general, amounts from 25 to 100 equivalent percent give very good results, and, in at least some applications, an optimum is about 100 equivalent percent.

An oxazoline or oxazine compound to be used in this invention functions very satisfactorily as curing agent alone: or a mixture of such oxazoline or oxazine compounds may be used with results that are also excellent. However, it is routine in the epoxy resin art that a mixture of curing agents of diverse natures can be employed and is sometimes preferred. Similarly, a mixture of curing agents can be employed according to the instant invention; one or more curing agents known in the prior art can be intimately mixed and combined with a portion of an oxazoline or oxazine compound according to the present invention, and the resulting mixture employed to cure a polyepoxide.

Such mixtures, when combined with a curable polyepoxide, seldom exhibit the inherent latency characteristic of mixtures of polyepoxide and oxazoline or oxazine compound alone. However, the other superior properties of the resins cured according to this invention are manifest in varying degrees according to the relative abundance of oxazoline or oxazine compound in the curing agent mixture. When the flexibility and resistance to shock characteristic of resins cured according to this invention are desired, then a curing agent mixture should comprise at least about 10 percent, on stoichiometric basis, of the dioxazoline or dioxazine curing agent.

Other curing agents to be employed in such mixtures are those known in the art and readily available by consulting the Lee and Neville handbook hereinbefore cited.

In preparing the latent curable polyexopide systems of the present invention, a polyepoxide or a mixture of more polyepoxides than one is combined with the dioxazoline or dioxazine compound or a mixture of more dioxazoline or dioxazine compounds than one. Intimate mixing and dispersion of each in the other is provided. They are commonly mutually soluble, yielding homogeneous mixtures of low viscosity.

In the resulting mixed condition the latent curable system of polyepoxide and diheterocyclic compound is completed and ready for uncured storage, optionally of unusually long duration, subsequent to which it can be heated to a curing temperature, whereupon it subsequently promptly cures.

The oxazoline or oxazine compound to be employed is any polyoxazoline compound representing more than one oxazoline group, average, per molecule, wherein the oxazoline groups are bonded together through an alkylene, an oxyalkylene, or a thioalkylene group or chain of such groups. The oxazine compound to be employed is any polyoxazine compound representing more than one oxazine group, average, per molecule, wherein the oxazine groups are bonded together through an alkylene, an oxyalkylene, or a thioalkylene group or chain of such groups.

A preferred group of compounds is that represented by a polyoxazoline or polyoxazine compound that has an average of more than one oxazoline or oxazine group per molecule, wherein the oxazine or oxazoline groups are bonded together through an alkylene, oxyalkylene, or thioalkylene, in which any alkylene, oxyalkylene or thioalkylene group is of from one to three, both inclusive, carbon atoms; or in which the oxazoline or oxazine groups are bonded together through a chain of up to about fifty alkylene, oxyalkylene or thioalkylene groups, in which chain any alkylene, oxyalkylene, or thioalkylene group is of from two to four, both inclusive, carbon atoms.

The nature and length of the moiety to which the oxazines or oxazolines are connected and by which they are bonded together influences the character of the resulting cured polyepoxide, inasmuch as the entire oxazine or oxazoline compound is bonded into and becomes an integral part of the resulting cured epoxy resin. Thus, when oxazine or oxazoline groups are connected to relatively short chain moieties or are connected to chain moieties by sites which are relatively close together, the resulting resin tends to be hard, and of limited tendency to deform under pressure. In contrast, when the oxazine or oxazoline moieties are relatively farther apart on such chains, or are terminal moieties on relatively long chains, the resulting cured epoxy resin has distinct elastomeric properties and is of lower tendency to be hard and unyielding. By the general application of such criteria it is possible, to a limited approximation, to choose starting polyoxazine or polyoxazoline reactive compounds the employment of which will yield cured epoxy resins of desired properties.

The polyepoxide is any curable polyepoxide starting material of the sorts well known in the art. A representative material is the diglycidyl ether of bisphenol A or bisphenol F; similarly, the condensation products of such glycidyl ethers with further bisphenol further epoxylated by reaction with further portions of epichlorohydrin are usefully employed. Also, the polyepoxides of polyloweralkylene glycols are usefully employed. Similarly, epoxylated novolak compounds are employed when desired, and also polyepoxide compounds derived from the epoxylation of uncharacterized and incompletely identified polyhydroxyaromatic side products from industrial processes. When it is desired to obtain a cured epoxy resin of low flammability or substantially fireproof, a starting material of choice will comprise, or may entirely consist of, a partially to completely brominated polyepoxide starting material. While brominated starting materials are usually the fire-retardant materials of choice, giving rise to partially brominated cured epoxy resins, materials otherwise halogenated are also used when desired.

Thus it will be apparent to those skilled in the epoxy resin art that any curable starting polyepoxide is to be employed, the choice of such material depending upon the properties desired in the cured product, upon the basis of criteria well known in the art.

PREPARATION OF THE DIOXAZINE AND DIOXAZOLINE CURING AGENTS

The dioxazoline and dioxazine compounds to be used as curing agents according to the present invention are prepared by any of a group of synthetic routes all of which pass, advantageously, through a cyano group; in the sense that, at each molecular site where an oxazine or oxazoline heterocycle is desired, there is provided as a precursor site, a cyano. From such site it is, in general, convenient and easy to go on to the desired heterocycle. The only condition believed to be limiting at this juncture is that, with respect to the reactions that go on from the cyano to the heterocycle, preferably the cyano be the most reactive or only significantly reactive site: or, if any other site on the starting cyano compound be more reactive than cyano, then known alternative procedures must be considered.

It is not difficult, and in the laboratory work carried out in the completion of the instant invention, it has become routine, to prepare the instant compounds with elegance and high purity. However, it is pointed out that for at least their reactivity as curing agents, such elegance is not required. Mixed starting materials can be used to give mixed products all within the single class, or genus, of such compounds as hereinbefore set forth, and all will function as indicated. Stoichiometry of starting materials can be permitted to vary in such fashion that substantially more, or somewhat fewer, average, oxazine or oxazoline heterocycles appear, per molecule, than precisely two as above indicated; and for at least their reactivity as curing agents, all will function as indicated. Similarly, the position isomery of substituents (but not within the nuclear structure of the oxazine or oxazoline moieties) may vary widely without impairing the products of this invention.

Many synthetic routes are known by which to provide reactive cyano sites as desired.

As illustrative, when R is an aromatic nucleus, so that —R—X—R— is a phenyl ether or sulfide nucleus, such starting material can be caused to react with formaldehyde in the presence of hydrochloric acid, to obtain a ring-chloromethylated product. Ring isomery may be controlled, or ignored. This product can then be caused to react with potassium cyanide in a routine metathesis to obtain cyano sites replacing the α-chlorine upon the chloromethylated sites. From such cyano sites, further synthesis of the instant oxazolines and oxazines is routine, as is shown below. It is not objectionable if slightly more or moderately fewer than exactly two such sites appear on any individual molecule.

In other procedures, a starting aromatic compound can initially carry aromatic hydroxyl groups at sites of subsequent reaction.

Such material can be condensed with an aliphatic cyano compound, in routine cyanoalkylation, to obtain, at the former hydroxyl sites, cyano alkyl ether structures that are then ready, as cyano compounds in general are, for further use in this invention.

In another procedure, chloromethylated styrene is caused to react with hydrogen sulfide, or with a dimercaptoalkane or the like, under free radical reaction conditions, such as are provided by the use of 2,2'-azobis(2-methylpropionitrile) as catalyst, a material which is often simply designated AIBN. Such reaction produces the saturated adduct, for example, bis(chloromethylphenylethyl) sulfide. Of such structure and related structures, the chloromethyl site reacts readily with potassium cyanide to obtain the corresponding bis-cyanomethyl compound from which oxazine-oxazoline derivatives are readily prepared.

Aliphatic oxazoline-bearing structures are equally readily prepared. Acrylonitrile is immediately available and is representative, as are the large number of other aliphatic cyano compounds. Reaction of the double bond with hydrogen sulfide or water obtains the saturated bis(2-cyanoethyl) sulfide or ether, which can be used to obtain a dioxazine or oxazoline.

In another procedure, oxetane can be reacted with hydrogen cyanide to obtain 3-cyano-1-propanol which can be etherified in the presence of dehydrating agent such as sulfuric acid to botain the bis(3,3'-cyanopropyl)ether.

From the cyano compound which in some structures can be classified as a nitrile, various routes to the instant oxazoline or oxazine structures are available. Each involves a first acyclic substitution at the cyano sites followed by a cyclizing reaction. Whether the resulting heterocycle is an oxazoline (5-membered) or oxazine (6-membered) ring will be determined by the chain length and structure of the acyclic substituent and is in each case entirely optional with the synthesis chemist. In many applications where the sole criterion to be met is that according to this invention there be provided a superior curing agent for an epoxy resin or a superior co-monomer, mixtures of oxazolines and oxazines will be as satisfactory as, or in some applications, more satisfactory than, compounds of high individual purity.

The most forthright route, procedurally, involves reactions of a mechanism which, when set out in detail, appears complicated; but procedures remain simple. This route involves causing a reaction of the cyano compound precursor with a lower alkylene chlorohydrin in the presence of hydrogen chloride, and upon the completion of that reaction, cyclizing the resulting intermediate with a substance, usually a base, which is an acceptor for the elements of hydrogen halide, such as triethylamine, tirmethylamine, or an alkali metal hydroxide. With ethylene chlorohydrin (2 - chloroethanol) this procedure leads to the oxazolines whilst with trimethylene chlorohydrin, (3-chloro - 1 - propanol) it leads to the oxazines: and with a mixture of chlorohydrins, a mixture of heterocycles.

Alternative to the foregoing, yet starting from the cyano structure, a group of related synthetic routes proceeds by a first oxidation of the cyano to the carboxyl, as in the presence of sulfuric acid and under protonating conditions. Upon completion of the conversion to the carboxyl form, the resulting intermediate is then converted to the acyl halide, such as the chloride; in one convenient method this conversion is brought about by reaction of the carboxyl compound with thionyl chloride. Acyl halides other than the chloride are available; and can be used.

From the acyl halide form, various optional routes proceed. The acyl chloride reacts readily with aziridine (ethyleneimine) to obtain an intermediate which, in turn, in the presence of basic hydrogen chloride acceptor, cyclizes to the desired oxazoline structure.

Similarly, azetidines are used. The unsubstituted material is not well known to the present inventors, but numerous azetidines in which the heterocyclic ring has been stabilized by substituents give good results. In general, substituents on the carbon atoms of azetidines appear in the final oxazine products as substituents upon the corresponding carbon atoms.

From the acyl halide form, valrious optional routes reaction of the acyl halide with an amino alcohol, to produce an acyclic intermediate which, from the amino alcohol, is hydroxyl terminated and which, under moderate conditions of dehydration, gives the desired cyclic compound. The identity of the cyclic compound is determined by the number of linear carbon atoms between the hydroxyl and the amino groups. If two, the product is an oxazoline. If three, the product is an oxazine: if a mixture, a mixed product results.

The foregoing represent the prime synthetic routes to substances of the instant invention. A few secondary routes are appropriate to be stated.

From vinyloxazoline or vinyloxazine by reaction with a sulfhydryl compound, usually an aliphatic sulfhydryl compound, an adduct is formed. Thus, two moles of vinyl oxazoline with one mole of hydrogen sulfide yield a bis(oxazolinylethyl) sulfide. Similarly, by choice of other unsaturated oxazoline compounds, adducts of a wide variety are formed. Routinely, such reactions will be catalyzed by use of free radical catalysts.

The remarks foregoing concerning the reactions of sulfhydryl compounds with vinyloxazoline pertain equally to vinyloxazine and to oxazine-oxazoline mixtures. The vinyloxazine is readily prepared from acrylonitrile by reaction with 3 - aminopropanol - 1 to obtain an intermediate and thereafter, by dehydration as with sulfuric acid, cyclizing the intermediate.

The cyclizing reactions in which precursor substances are converted into the oxazoline or oxazine compounds of the present invention are, in general exothermic and, in general, they do not require extreme conditions to be initiated. As such cyclizing reactions go forward, there is at least some tendency for competing reactions to take place in which, in a manner that has not been fully studied, polymeric substances appear to be formed. Such polymeric substances tend to be gummy or weakly resinous substances and of no presently recognized value, and are not desired. Higher temperatures favor the production of such polymeric substances, and, accordingly, it will oftentimes be desired to maintain reaction temperatures as low as is convenient. Accordingly, the addition of cyclizing agent will oftentimes be carried out slowly, portionwise, and with the resulting reaction mixture cooled or chilled.

Good results are usually obtained when the cyclizing reaction according to the present invention is carried out at a temperature between −30° C. and +40° C. Within this range, at or beyond the lower limit, the cyclizing reaction goes forward very slowly; above the upper limit competing and probably polymerizing reactions go forward at such rate as to be wasteful. A preferred temperature range will vary somewhat according to the precise identity of the precursor substance to be cyclized and also according to the identity of the cyclizing agent; but, in general, a cyclizing reaction temperature of 0 to +10° C. will be preferred. When such temperatures are employed, however, it may at times be advantageous to drive the last aspects of the reaction to completion by the application of moderate heat or at least the removal of cooling for a terminal interval of reaction time.

The reaction can be carried out in the absence of liquid reaction medium. However, there is considerable tendency for employed materials, especially very pure materials, to crystallize; in this condition, the orderly procedure of the cyclizing reaction may be inhibited, and it will usually be desired to prevent or diminish crystallization by the addition of some liquid solvent that is inert to the reaction that is taking place, whereby to maintain an entire reaction mixture in the liquid phase until reactions are substantially complete. Solvent can be chosen for such volatility that it is thereafter readily stripped away.

The precise relationship between the amount of reactant to be cyclized and the capacity of the vessel in which cyclization is carried out is not critical. In general, the inventory of starting material and the capacity of the vessel in which cyclization is to be carried out should be such that good, thorough, prompt, and complete agitation, such as stirring, is convenient.

In general, the atmosphere within the vessel in which cyclization takes place is not critical and may be air. It may also be air saturated with vapors of a volatile solvent. When cyclodehydrohalogenating, as in the instance of a chloroalkylamide or chloroalkylamidate skilled chemists will at once recognize that the ambient atmosphere must not be richly supplied with hydrogen halide from outside source, since it would compete in the cyclizing reaction.

The starting amide or amidate compound to be cyclized can be obtained as an article of commerce and supplied as an existing entity to the reaction vessel. Alternatively, and conveniently, when desired, the starting material that is to be cyclized can be prepared in the same vessel in which it is subsequently cyclized, such preparation taking place immediately or shortly prior to the cyclization reaction if desired. The reaction conditions necessary to prepare the chloroalkylamide or amidate or the hydroxyalkylamide are closely similar to those employed in the cyclization, and such in situ preparation may be preferred.

Upon the completion of the synthesis of compounds according to this invention, work-up, that is to say, the separation and sufficient purification of the resulting products is not difficult. Most advantageous procedures will be determined upon the basis of the exact preparatory procedures observed. Thus, when hydrogen halide acceptor reacting with the elements of hydrogen halide obtains a water-soluble product, the entire reaction vessel contents can be, if desired, mixed with water and thoroughly stirred to wash the reaction vessel contents; typically, the resulting mixture separates promptly into an aqueous and an organic layer, product being predominantly in the organic layer.

Distillation can be employed to separate and purify product according to this invention, and the bulk of material necessary to be distilled can sometimes be reduced by such prior water washing.

Crude or partially purified product sometimes gives evidence that the desired product of the invention is a solid. In such instance, vacuum distillation is often of use in purification of product; but also, it is at times useful to take crude product up in and recrystallize it from solvent. At least in laboratory quantities, ordinary solvents give good results, such as a mixture of four parts diethyl ether and one part acetone by volume. Isopropanol is also at times used with good results to obtain a recrystallized solid product.

PREPARATION AND CURING OF DIOXAZOLINE CURED EPOXY RESIN

The best modes known to the inventor of practicing this invention are now set forth.

A mixture of equimolecular amounts of 2,2'-[ethylene bis(oxyethylene)]bis(2 - oxazoline) and 2,2-bis(p-(2,3-epoxypropoxy)phenyl)propane, presently 1.28 gram of the former (0.005 mole) and 1.9 gram of the latter (also 0.005 mole) were combined to obtain a colorless, mobile, homogeneous viscous, readily pourable, substantially water clear liquid. The liquid is curable with heat to obtain an epoxy resin.

In the instant example the resulting liquid was divided into three approximately equal but unweighed portions, and they were designated as A, B, and C. Portion A was permitted to stand in open air in a small aluminum tray, and was observed during a month. Portion B was heated for four hours at 250° F. (approximately 121° C.) and portion C was heated for ten hours at 350° F., (approximately 177° C.), each in a small, open aluminum tray. Whereas the sample maintained at room temperature underwent no visible change during a month, the heated samples both became hard. Sample B became a very pale yellow, tough resin which was swellable and susceptible of deterioration in physical form upon being soaked in acetone, water, or benzene. Sample C became brown, tough, and in the thin plate here prepared, was yielding and horny in character. Prolonged soaking in water and benzene were without effect and prolonged soaking in acetone increased the apparent elasticity of the material slightly.

In similar procedures, 2,2'-[propylene bis-(oxyethylene)]bis(2-oxazoline) was intimately mixed into and stirred with an equimolecular amount of 2,2-bis(p-(2,3-epoxypropoxy)phenyl)propane to obtain a substantially colorless, mobile, homogeneous solution of viscosity substantially lower than that of the starting epoxypropoxyphenyl propane compound.

The resulting solution was divided, again, into samples designated as A, B, and C and each was maintained in a small, open, aluminum tray. Sample A, allowed to stand at room temperature (approximately 25° C.) for one month showed substantially no change. The sample remained a colorless, mobile liquid of low viscosity. Sample B was heated for four hours at 250° F. in an open tray whereas sample C was heated for ten hours at 350° F. also in an open tray. After such heating, sample B was somewhat susceptible of solvent deterioration and was in the form of a light yellow, tough resin. After heating, sample C was a thin plate or chip of a brown, tough, horny resin upon which prolonged soaking in acetone, water, or benzene had no visible effect.

In yet further procedures, 2,2'-tetramethylene di-2-oxazoline was intimately mixed and stirred with an equimolecular amount of the epoxypropoxy phenyl propane compound hereinbefore mentioned. In the manner hereinbefore described the sample was divided into three portions, designated A, B, and C. Each portion was maintained in a small, open aluminum tray. At the end of one month at room temperature, sample A appeared to be unchanged, remaining a water white mobile liquid with traces of suspended crystalline oxazoline compound. Sample B was heated at 250° F. for four hours and became a light tan, tough, slightly elastic resin susceptible of being bent; it was softened and plasticized by prolonged soaking in acetone and only slightly softened by similar exposure to benzene and to water. Sample C was heated at 350° F. for ten hours, and, in a thin section became a brown, tough, horny resin upon which prolonged soaking in acetone, water, or benzene had no visible effect.

Equimolecular amounts were combined of 2,2'-oxydiethylene)bis-2-oxazoline, and a diepoxide primarly 2,2-bis(p-(2,3-epoxypropoxy)phenyl)propane but containing also small amounts of other condensation products of higher molecular weight including notably condensation products of the indicated epoxypropoxyphenyl propane with bisphenol A and with epichlorohydrin. The epoxide was a standard commercial product, known in commerce as D.E.R. 332; a nearly colorless viscous liquid. The resulting mixture was mobile, nearly colorless, homogeneous and uniform, of viscosity lower than that of the uncombined epoxide. The resulting solution is essentially stable for prolonged storage at room temperature, but begins to cure upon heating at a temperature of aproximately 250° F. and cures rapidly and completely at 300° F. The products prepared at higher curing temperatures are more resistant to heat distortion. Also, the compound 2,2'-(thiodiethylene)bis(2-oxazoline) was mixed and combined intimately with a further portion of the D.E.R. 332 polyepoxide described above, to obtain a colorless, mobile, homogeneous solution of viscosity lower than that of the uncombined epoxide. Upon storage over a prolonged period of time at room temperature, the combination shows no visible tendency to react with cure or increase of viscosity; cure initiates and goes forward promptly at a temperature of 250 to 300° F.; and, as above noted, the cured products manifest a higher heat distortion temperature when cured at higher temperatures.

The dioxazine curing agents of this invention are used as are the dioxazolines, interchangeably, or mixed, in all routine applications. Considerations of stoichiometry are essentially the same, as are curing times, temperature, and the like.

The oxazines most preferred in the curing of a polyepoxide to an epoxy resin are chosen with reference to the application intended, but for all-purpose good results the preferred oxazines are tetramethylenebisoxazine

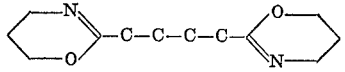

the compound has an oxazine equivalent weight of 102; its infrared spectrum presents well defined absorption maxima at 1030, 1170, and 1815 cm.$^{-1}$. Its nuclear magnetic resonance spectrum, in $CCl_4$ with $(CH_3)_4Si$ as internal standard shows a characteristic triplet, $\delta$ of 3.1 p.p.m., approximately; and thiodiethylenebis-oxazine

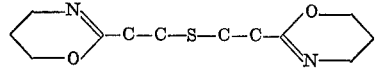

which has an oxazine equivalent weight of 118; its infrared spectrum shows the peaks above described. Its NMR spectrum shows a quintet at $\delta$ of 1.72 p.p.m. and a triplet at 3.85 p.p.m.

Of a commercial liquid polyepoxide, generally, the diglycidyl ether of bisphenol A, 18.5 grams (0.1 gram equivalent) are intimately mixed and stirred into 10.2 grams of 2,2'-tetramethylenebis-5,6-dihydro-4H-1,3-oxazine. The resulting mixture is divided into three aliquots of a little more than nine grams each, and each is then transferred to a small aluminum cup. One is maintained on a laboratory shelf, covered; at the end of a month it has shown no evident change in viscosity, or other properties. A second one is heated at 250° F. for four hours; it becomes a tough resin slightly swollen under prolonged exposure to acetone. The third is heated at 350° F. for three hours. It becomes a tough, translucent, medium brown resin not evidently affected by prolonged soaking in acetone, water, or benzene.

Similarly, 17.2 grams, 0.1 gram equivalent of a commercial epoxy novolak are intimately mixed and blended into 11.8 grams 2,2'-thiodiethylenebis-5,6-dihydro-4H-1,3-oxazine, and the resulting mixture treated as described foregoing. The visible results are essentially the same.

The present invention is practiced in its other aspects in much the same manner as here indicated. As is the case with epoxy resins, generally, the uncured product can, if desired, be mixed and combined with any of a great many filler substances including finely powdered silica, wood flour, dyes and pigments, metallic flake and the like; the product may be used in the ways known to employ prior art epoxy resins including the application as coatings, as resins cast in molds, in the "potting" of electrical components and the like.

I claim:

1. A latent curable polyepoxide composition comprising in combination, a curable poly 1,2-epoxyalkyl compound having an average of more than one 1,2-epoxyaliphatic group per molecule and a curing amount of a di-2-oxazine or di-2-oxazoline compound of the formula

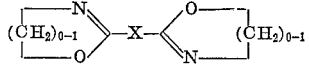

wherein X is one of the divalent moieties

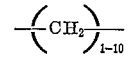

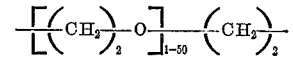

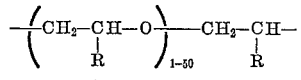

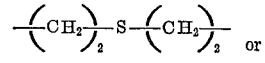

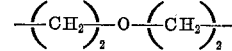

wherein R is alkyl of from one to three, both inclusive, carbon atoms.

2. Composition of claim 1 in which the polyepoxide comprises essentially 2,2-bis(p-(2,3-epoxypropoxy)phenyl) propane.

3. Composition of claim 2 in which the oxazine or oxazoline compound is supplied in such amount as to provide one oxazine or oxazoline group for each epoxypropoxy group.

4. Composition of claim 1 in which the polyepoxide is predominantly the diglycidyl ether of bisphenol A, and the oxazoline compound is tetramethylenebis-2-oxazoline; in such quantities that the composition comprises approximately one oxazoline for each oxirane.

5. Composition of claim 1 in which the polyoxazoline compound is 2,2'-thiodiethylenebis dioxazoline.

References Cited

UNITED STATES PATENTS 3,493,568  2/1970  Levy et al. _____ 260—2
3,509,231  4/1970  Ranck et al. _____ 260—2

WILLIAM H. SHORT, Primary Examiner

T. E. PERTILLA, Assistant Examiner

U.S. Cl. X.R.

117—161 ZB; 260—2 N, 9 R, 37 Ep, 59, 79, 830 TW

PO-1050
(5/69)

UNITED STATES PATENT OFFICE
CERTIFICATE OF CORRECTION

Patent No.     3,630,996                    Dated    28 December 1971

Inventor(s)       Donald A. Tomalia

It is certified that error appears in the above-identified patent and that said Letters Patent are hereby corrected as shown below:

Column 3, line 21, delete "polyexopide" and insert --polyepoxide--.

Column 5, line 33, delete "botain" and insert --obtain--.

line 56, delete "tir-" and insert -- tri- --.

Column 6, line 10, delete "form valrious optional routes" and insert --another synthetic route requires--.

Signed and sealed this 15th day of August 1972.

(SEAL)
Attest:

EDWARD M. FLETCHER, JR.          ROBERT GOTTSCHALK
Attesting Officer                Commissioner of Patents